United States Patent
Toyoda

(10) Patent No.: US 9,619,736 B2
(45) Date of Patent: Apr. 11, 2017

(54) IMAGE FORMING APPARATUS THAT PERFORMS WRITING INTO A NON-VOLATILE MEMORY, AND A METHOD

(71) Applicant: Kyocera Document Solutions Inc., Osaka (JP)

(72) Inventor: Takashi Toyoda, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/602,379

(22) Filed: Jan. 22, 2015

(65) Prior Publication Data

US 2015/0213338 A1   Jul. 30, 2015

(30) Foreign Application Priority Data

Jan. 29, 2014 (JP) .................................. 2014-014213

(51) Int. Cl.
  *G06K 15/00* (2006.01)
  *H04N 1/00* (2006.01)
  *H04N 1/32* (2006.01)

(52) U.S. Cl.
  CPC ............ *G06K 15/00* (2013.01); *G06K 15/40* (2013.01); *H04N 1/00928* (2013.01); *H04N 1/00933* (2013.01); *H04N 1/32571* (2013.01); *G06K 15/408* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 2004/0080773 A1* | 4/2004 | Jamison | .............. | G06F 11/0733 358/1.14 |
| 2004/0100655 A1* | 5/2004 | Endo | .................. | G06Q 20/3821 358/1.15 |
| 2011/0153973 A1* | 6/2011 | Kim | .................... | G11C 14/0018 711/165 |

FOREIGN PATENT DOCUMENTS

JP        2004348342        12/2004

* cited by examiner

*Primary Examiner* — Christopher D Wait
(74) *Attorney, Agent, or Firm* — K&L Gates LLP

(57) ABSTRACT

The image forming apparatus includes a non-volatile memory that stores data; a volatile memory into which the stored data is read for editing; a reading unit that reads the data from the non-volatile memory into the volatile memory; an editing unit that edits the read data; and a writing unit that writes the edited data into the non-volatile memory. The non-volatile memory further includes a writing type that is associated with the data and provides a rule of how to write at the time of writing the data into the non-volatile memory after editing the data on the volatile memory. The reading unit reads the writing type at the time of reading the data. The writing unit writes, based on the writing type associated with the edited data, the data into the non-volatile memory.

8 Claims, 6 Drawing Sheets

IMAGE FORMING APPARATUS THAT PERFORMS WRITING INTO A NON-VOLATILE MEMORY, AND A METHOD

INCORPORATION BY REFERENCE

This application is based on, and claims priority to corresponding Japanese Patent Application No. 2014-014213, filed in the Japan Patent Office on Jan. 29, 2014, the entire contents of which are incorporated herein by reference.

FIELD

Unless otherwise indicated herein, the description in this field section or the background section is not prior art to the claims in this application and is not admitted to be prior art by inclusion in this section. The present disclosure relates to an image forming apparatus that performs writing into a non-volatile memory.

BACKGROUND

In a typical non-volatile memory such as a flash memory, in a case where data is written thereinto, the data is read into a volatile memory serving as a write buffer once, the data is edited on the volatile memory, and the edited data is written into the non-volatile memory after completion of the editing.

Based on the above-described control, the number of times required to write into the non-volatile memory is reduced, the time of writing process is reduced, and the life of the non-volatile memory where a restriction is put on the number of times writing thereinto is prolonged.

However, in the above-described control, all the data in the write buffer is written into the non-volatile memory at a time point when a series of processing operations finishes. Therefore, if a long series of processing operations is performed, the number of times writing into the non-volatile memory is increased.

Furthermore, data required to be immediately written in the middle of the series of processing operations is not written until the completion of the series of processing operations, and reflecting an editing result in the non-volatile memory is delayed.

SUMMARY

The present disclosure relates to an image forming apparatus that writes data into a non-volatile memory in accordance with a write timing required for data and a method.

According to an embodiment of the present disclosure, the image forming apparatus includes: a non-volatile memory that stores data; a volatile memory into which the stored data is read for editing; a reading unit that reads the data from the non-volatile memory into the volatile memory; an editing unit that edits the read data; and a writing unit that writes the edited data into the non-volatile memory.

The non-volatile memory further includes a writing type that is associated with the data and provides a rule of how to write at the time of writing the data into the non-volatile memory after editing the data on the volatile memory.

The reading unit reads the writing type at the time of reading the data.

The writing unit writes, based on the writing type associated with the edited data, the data into the non-volatile memory.

Additional features and advantages are described herein, and will be apparent from the following Detailed Description and the figures.

BRIEF DESCRIPTION OF THE FIGURES

All drawings are intended to illustrate some aspects and examples of the present disclosure. The drawings described are only schematic and are non-limiting, and are not necessarily drawn to scale.

DETAILED DESCRIPTION

Figure 1:
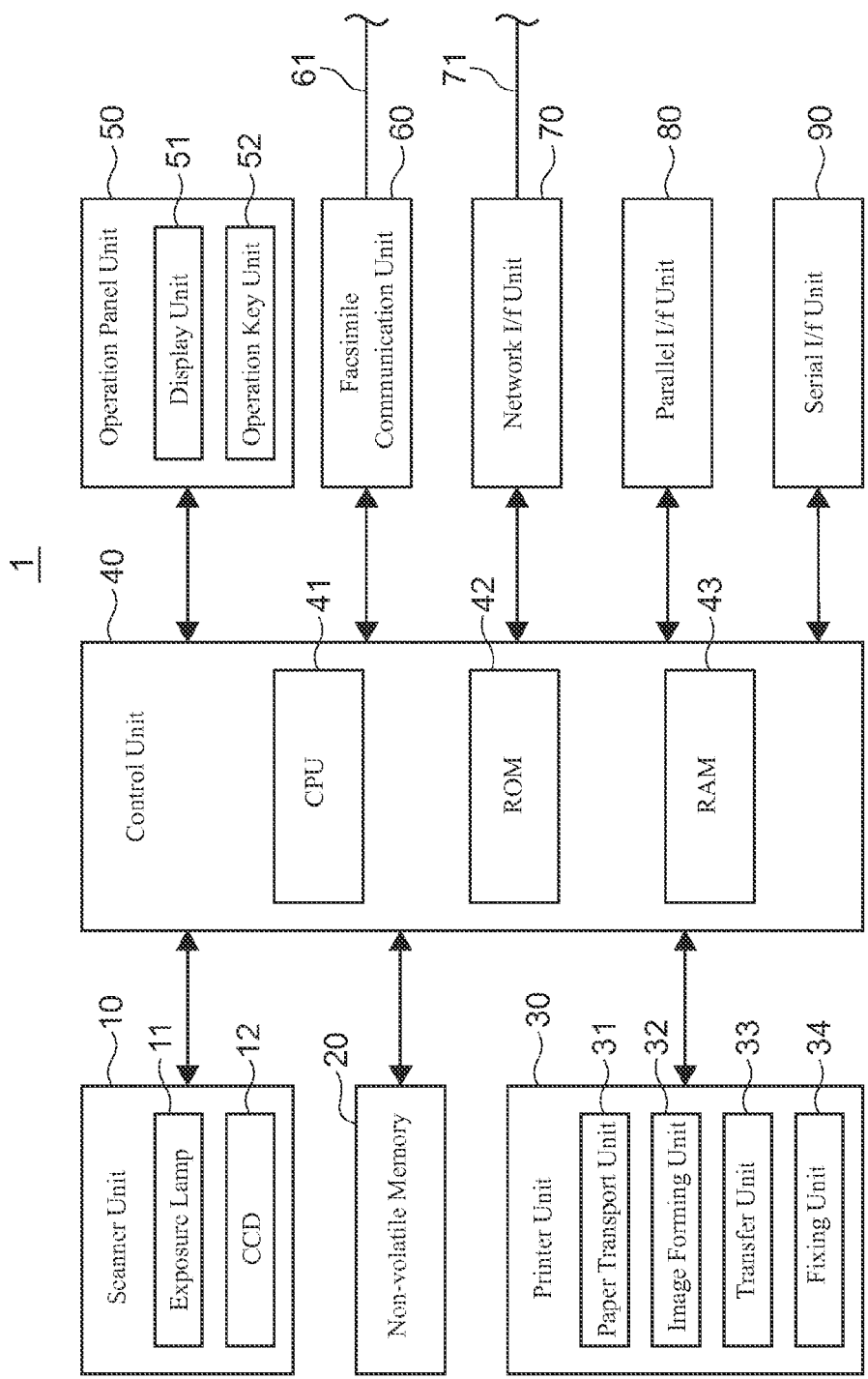
FIG. 1 is a schematic diagram illustrating a block configuration of an image forming apparatus according to an embodiment of the present disclosure.

Various embodiments are described below with reference to the figures. It should be understood, however, that numerous variations from the depicted arrangements and functions are possible while remaining in the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

An image forming apparatus 1 according to an embodiment is configured to edit data on a non-volatile memory, after the data is read from the non-volatile memory onto a volatile memory serving as a write buffer and edited, the data is written back.

In the image forming apparatus 1, information is added to data to be stored in the non-volatile memory such as a flash memory, the information indicating a timing when the data is written into the non-volatile memory.

Based on the above-described configuration, by optimizing the number of times writing of data into the non-volatile memory is performed, it is possible to prolong the life of the non-volatile memory where a restriction is put on the number of times writing thereinto is performed and it is possible to improve data writing performance.

Furthermore, it is conceivable that, by optimizing the number of times writing is performed, the frequency of the occurrence of waiting for data reading due to data writing process is reduced. Therefore, improvement of data reading performance may be expected.

In addition, as for data needed to be immediately reflected in the non-volatile memory, even in the middle of a series of processing operations, it is possible to perform immediate writing.

[Classification of Data Based on Write Timing]

Here, three classifications of data based on the timing of writing data into the non-volatile memory will be adopted and described. These three classifications are just an example, and two classifications or four or more classifications may be used.

(1) Data Whose Reflection in the Non-Volatile Memory is Immediately Performed

An example of data where writing into the non-volatile memory is immediately performed after editing of the data on the volatile memory, is data such as the page counter of the image forming apparatus, which is not to be erased by power-off of the image forming apparatus in the middle of a series of processing operations.

(2) Data Whose Reflection in the Non-Volatile Memory is Performed with a Specified Period Data where writing into the non-volatile memory is performed only after a preliminarily defined period comes after editing of the data on the volatile memory is cited. An example of data belonging to this classification, is data where a great restriction is not put on a timing of being reflected in the non-volatile memory while being changed with a high frequency. In addition, as the term, period, here, a period of several seconds is assumed.

Even if a long series of processing operations is performed, writing is not performed until the defined period comes. Therefore, it is possible to reduce the number of times writing is performed.

(3) Data Whose Reflection in the Non-Volatile Memory is Performed at the Time of Shutdown of the Image Forming Apparatus An example of data belonging to this classification is data where, after editing of the data on the volatile memory, writing is not performed until a point in time when the image forming apparatus is shut down.

Unlike in the case of a general personal computer, in the image forming apparatus, adequate shutdown process is not performed by a user, and there is a high possibility that the image forming apparatus is suddenly powered off. Therefore, data belonging to this classification is data where the adequate shutdown process is not performed and erasing thereof is acceptable.

[Configuration of Image Forming Apparatus]

First, the configuration of an image forming apparatus according to an embodiment will be described. FIG. 1 is a schematic diagram illustrating the block configuration of the image forming apparatus 1 according to an embodiment of the present disclosure. The image forming apparatus 1 is, for example, multi-function peripheral (MFP) that combines a plurality of functions relating to image formation, such as a copying function, a printer function, a facsimile function, and a scanner function.

The image forming apparatus 1 is configured to include a scanner unit 10, a non-volatile memory 20, a printer unit 30, a control unit 40, an operation panel unit 50, an facsimile communication unit 60, a network I/F unit 70, a parallel I/F unit 80, and a serial I/F unit 90.

Using the scanner unit 10, the non-volatile memory 20, the control unit 40, the operation panel unit 50, and the network I/F unit 70, there is realized a network scanner function for encrypting and transmitting captured image data, as an electronic mail, to a preliminarily specified mail address or directly transmitting the captured image data to an IP address.

Using the scanner unit 10, the non-volatile memory 20, the printer unit 30, the control unit 40, the operation panel unit 50, and the facsimile communication unit 60, the facsimile function is achieved. Furthermore, using the non-volatile memory 20, the printer unit 30, the control unit 40, the operation panel unit 50, the network I/F unit 70, and the parallel I/F unit 80, the printer function is achieved. In addition, using the scanner unit 10, the non-volatile memory 20, the printer unit 30, the control unit 40, and the operation panel unit 50, the copying function is achieved.

The operation panel unit 50 is used by a user to perform operations relating to the copying function, the printer function, the facsimile function, the scanner function, and so forth. In addition to this, the operation panel unit 50 provides, to the control unit 40, an operation instruction issued by the user, such as, for example, an image formation instruction to instruct to print information stored in the non-volatile memory 20.

The operation panel unit 50 receives inputting of the identification information of the user, for example, a password known only by a user permitted to access confidential information, in other words, a password serving as identification information for identifying that the user who knows the relevant password is a user permitted to access the confidential information, or a user ID serving as identification information for individually identifying each user.

The operation panel unit 50 includes a display unit 51 including a touch panel or the like, and an operation key unit 52 including a start key, a numerical keypad, and so forth.

The display unit 51 includes a touch panel unit, which is able to display and in which a touch panel and a liquid crystal display (LCD) are combined, or the like, displays various operation screens, and enables an input operation to be performed.

At the time of executing, for example, the facsimile function, the display unit 51 displays information relating to user selection, transmission destination selection, a transmission setting, and so forth and displays operation buttons and so forth for inputting various operation instructions in response to the touch of the user on the relevant portions.

The operation key unit 52 is used for inputting various instructions based on the user, such as an instruction to start execution of copying and an instruction to start facsimile transmission.

The scanner unit 10 optically acquires a manuscript image and generates image data. The scanner unit 10 includes an exposure lamp 11 and a charge-coupled device (CCD) 12. The scanner unit 10 irradiates the manuscript with the exposure lamp 11 and light-receives the reflected light thereof using the CCD 12, thereby reading the manuscript image and outputting, to the control unit 40, image data corresponding to the read image. The scanner unit 10 may read not only a monochrome manuscript but also a color manuscript or a photographic manuscript.

The non-volatile memory 20 is an example of a storage unit that stores therein, for example, the image data of a manuscript encrypted by the control unit 40. While the non-volatile memory 20 may be a non-volatile semiconductor memory such as a solid state drive (SSD) or a hard disk drive (HDD), it is assumed that, in an embodiment, the non-volatile memory 20 is a non-volatile memory where the number of times rewriting of data is performed is restricted, in particular, a NOR-type flash memory.

The printer unit 30 acquires, from the control unit 40, the image data of a manuscript read by the scanner unit 10, image data received from an external personal computer through the network I/F unit 70, and image data such as facsimile data received from an external facsimile apparatus by the facsimile communication unit 60 and prints images corresponding to these pieces of image data on predetermined recording paper.

The printer unit 30 is, for example, an electro-photographic image forming unit that includes a paper transport unit 31 including a paper feeding cassette, a paper feeding roller, and so forth, an image forming unit 32 including an intermediate transfer body roller, a photoreceptor drum, an exposure apparatus, a development apparatus, and so forth, the transfer unit 33 including a transfer roller and so forth, and a fixing unit 34 including a fixation roller and so forth.

The facsimile communication unit 60 includes a coding and decoding unit (not illustrated), a modulation and demodulation unit (not illustrated), and a network control unit (NCU: not illustrated), transmits the image data of a manuscript read by the scanner unit 10 to another facsimile apparatus through a communication line 61 such as a phone line or an internet connection, and receives image data transmitted from another facsimile apparatus.

The coding and decoding unit compress and codes image data to be transmitted and expands and decodes received image data. The modulation and demodulation unit modulates the compressed and coded image data into an audio signal and demodulates a received signal (audio signal) into image data. In addition, the NCU controls a connection with a facsimile apparatus to serve as a transmission destination, the connection using a phone line.

Using a network interface (for example, 10/100 base-TX) or the like, the network I/F unit 70 controls transmission and reception of various kinds of data with a terminal device (not illustrated) such as an external personal computer connected through a local area network (LAN) 71. The network I/F unit 70 transmits, for example, manuscript image data read by the scanner unit 10 and encrypted by the control unit 40, to the terminal device as an electronic mail, and receives, for example, image data sent from the terminal device so as to be printed in the printer unit 30.

Using a high-speed bidirectional parallel interface (compliant with, for example, IEEE 1284) or the like, the parallel I/F unit 80 receives, for example, print data or the like from an external apparatus, based on parallel transmission in which data is transmitted in units of bits using a plurality of signal lines.

Using a serial interface (for example, RS-232C), the serial I/F unit 90 receives, for example, various kinds of data from an external apparatus or the like, based on serial transmission in which data is sequentially sent one bit at a time using a single signal line.

The control unit 40 includes a central processing unit (CPU) 41, a read only memory (ROM) 42 storing therein a predetermined control program, a random access memory (RAM) 43 (a volatile memory) temporarily maintaining data, and so forth. Using these, the control unit 40 controls the entire image forming apparatus 1 in accordance with instruction information received by the operation panel unit 50 or the like or detection signals from sensors provided at individual positions of the image forming apparatus 1.

Figure 2:
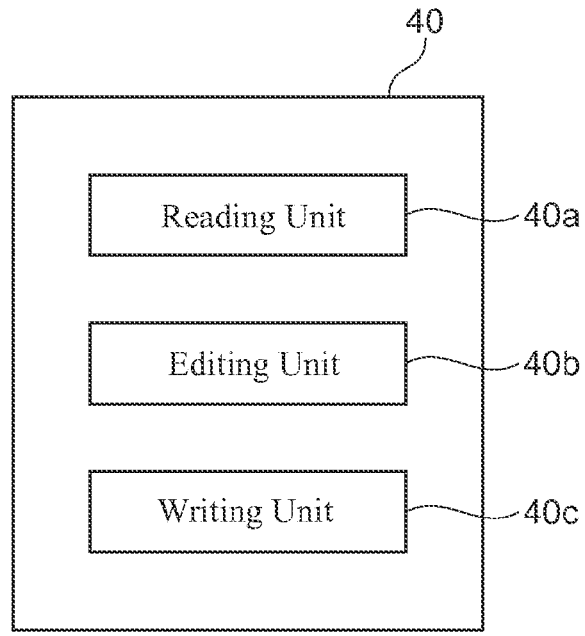
FIG. 2 is a schematic diagram illustrating a functional block configuration of a control unit in the image forming apparatus.

In addition, as functional blocks realized by the CPU 41 executing the control program stored in the ROM 42, there are a reading unit 40a, an editing unit 40b, and a writing unit 40c as illustrated in FIG. 2.

The reading unit 40a reads, onto the RAM 43, data on the non-volatile memory 20 and so forth. In addition, at the time of reading, a configuration in which all the data on the non-volatile memory 20 is collectively read may be adopted or a configuration in which only data or the like necessary for process is read on a case-by-case basis may be adopted.

The editing unit 40b updates (edits) data read onto the RAM 43. After the editing, an edit flag associated with the edited data is set and it is indicated that the data has already been edited.

With data, whose edit flag is set, as a target, the writing unit 40c writes (writes back) the data on the RAM 43 into the non-volatile memory 20 in accordance with information (a writing type) that is associated with the data on the RAM 43 and indicates a temporal rule for writing the data. The details of writing will be described later.

A program, which is read by a computer serving as the control unit 40, thereby achieving the above-described individual functions, may be stored in a non-volatile external storage device such as the non-volatile memory 20, may be arbitrarily transferred to a main storage device such as the RAM 43, and may be made available for execution by the CPU 41.

A scanner controller controls the operations of individual units used for achieving the scanner function.

A facsimile controller controls the operations of individual units used for achieving the facsimile function. At the time of performing facsimile transmission, the facsimile controller specifies a phone number stored in the non-volatile memory 20 and causes the image data of a manuscript read by the scanner unit 10 to be directly transmitted to the facsimile apparatus or the like through the communication line 61, using the facsimile communication unit 60.

A printer controller controls the operations of individual units used for achieving the printer function.

A copying controller controls the operations of individual units used for achieving the copying function.

A non-volatile memory controller initializes the non-volatile memory 20, creates a partition, and performs I/O control such as writing of data and reading thereof.

[Regarding Data Structure of Block]

Figure 3:
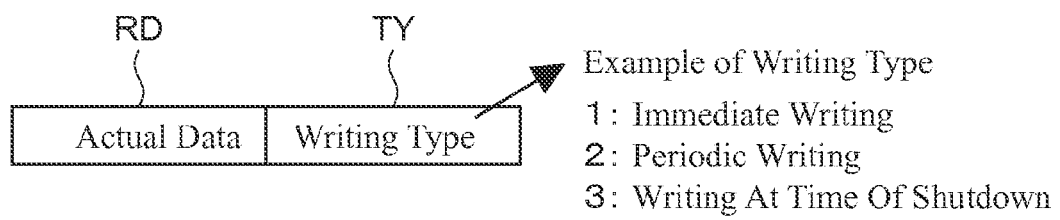
FIG. 3 is a schematic diagram illustrating a configuration of a block serving as an access unit with which reading from or writing into a non-volatile memory is performed in the image forming apparatus.

Next, the structure of a block (page) serving as an access unit with which reading from or writing into the non-volatile memory 20 is performed in the image forming apparatus 1 will be described. FIG. 3 is a schematic diagram illustrating the configuration of a block serving as the access unit with which reading from or writing into the non-volatile memory 20 is performed in the image forming apparatus 1.

The block includes actual data RD used for process in the control unit 40 and a writing type TY that is associated with that actual data RD and indicates a timing when writing of the actual data RD from the RAM 43 into the non-volatile memory 20 is performed.

In addition, here, as examples of a value taken by the writing type, it is assumed that immediate writing is performed in the case of "1", periodic writing is performed in the case of "2", and writing at the time of shutdown of the image forming apparatus 1 is performed in the case of "3".

Note that the life of the non-volatile memory 20 is defined as the number of times writing into this block is performed or the number of times this block is erased.

In addition, the value the writing type is set to may be defined at the time of the design of the image forming apparatus 1, may be set at the time of the factory shipment of the image forming apparatus 1, may be automatically set as appropriate on a case-by-case basis by a program executed in the control unit 40 at the time of the operation of the image forming apparatus 1, or may be set by the user of the image forming apparatus 1.

[Regarding Configuration in Non-Volatile Memory 20]

Figure 4:
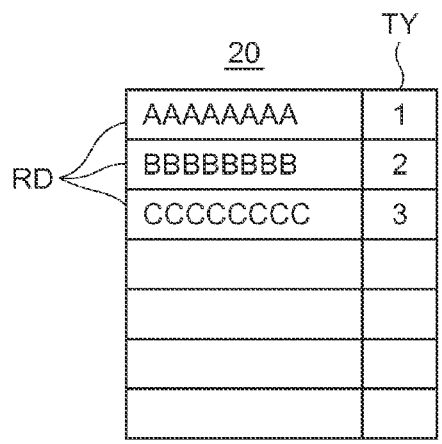
FIG. 4 is a schematic diagram illustrating a configuration of the block on the non-volatile memory.

Next, how the above-described block is configured on the non-volatile memory 20 will be described. FIG. 4 is a schematic diagram illustrating the configuration of the above-described block on the non-volatile memory 20.

As illustrated in this drawing, on the non-volatile memory 20, a configuration in which blocks each including the pair of the actual data RD and the writing type TY are arranged is adopted. In addition, here, in the actual data, "AAAAAAAA", of a block arranged at the beginning of the non-volatile memory, the writing type is "1", and it is indicated that the actual data is data on which immediate writing is performed in a case of being edited on the RAM 43.

In addition, it is desirable that, in the non-volatile memory 20, data is arranged in such a configuration in an initial state such as factory default.

[Regarding Correspondence between Non-Volatile Memory 20 and RAM 43]

Figure 5:
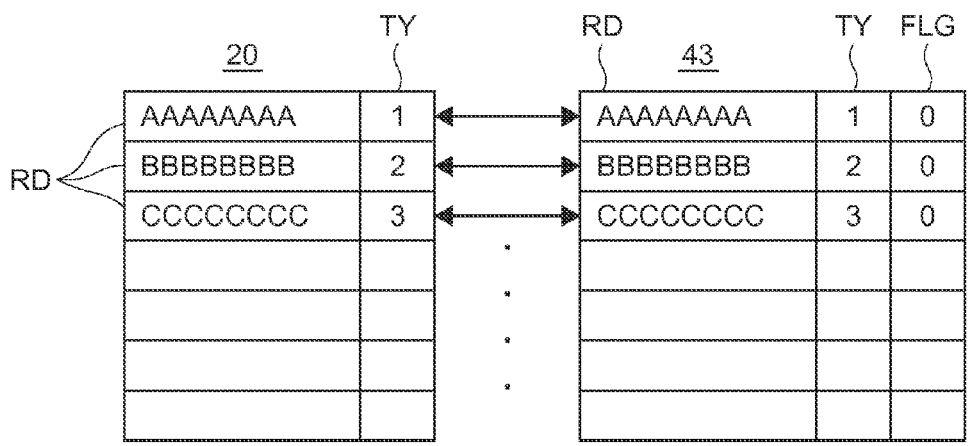
FIG. 5 is a schematic diagram illustrating a correspondence between the configuration of the block on the non-volatile memory and the configuration of the block on a RAM.

Regarding the arrangement of blocks, how a configuration on the non-volatile memory 20 and a configuration on the RAM 43 correspond will be described. FIG. 5 is a schematic diagram illustrating a correspondence between the configuration of the block on the non-volatile memory 20 and the configuration of the block on the RAM 43.

Note that this drawing illustrates a state in which while the reading unit 40a reads the block on the non-volatile memory 20 onto the RAM 43, update of the actual data RD by the editing unit 40b has not been performed yet.

As illustrated in this drawing, the block on the non-volatile memory 20 and the block read onto the RAM 43 correspond one-to-one with each other. In addition, on the RAM 43, an edit flag FLG indicating whether or not the actual data RD of each block is updated is associated with the corresponding actual data RD and arranged.

Note that, here, it is assumed that a case where the edit flag is "0" indicates that the corresponding actual data RD is non-updated and a case where the edit flag is "1" indicates that the corresponding actual data RD is already updated.

[Regarding Process at Time of Data Update]

Figure 6:
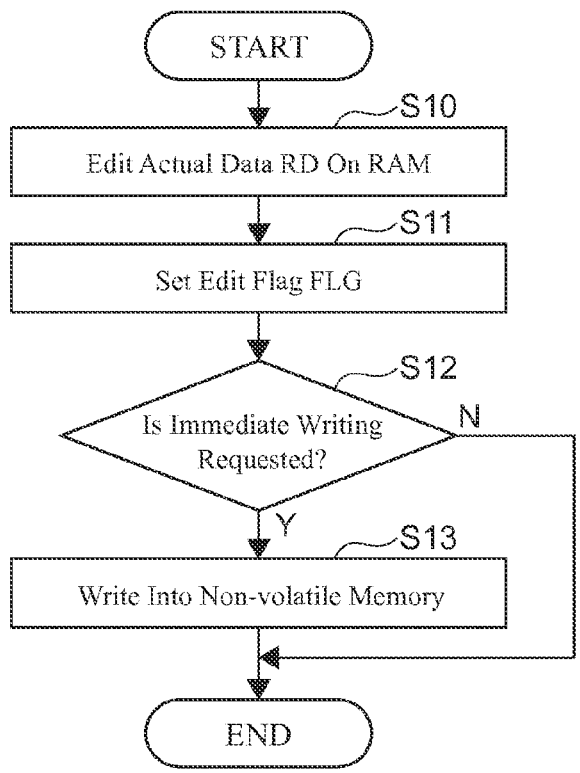
FIG. 6 is a flowchart of process when actual data on the RAM is updated.

Next, process when the actual data RD on the RAM 43 is updated will be described. FIG. 6 is the flowchart of the process when the actual data RD on the RAM 43 is updated.

First, the editing unit 40b edits the actual data RD on the RAM 43 (step S10).

Next, the editing unit 40b sets the edit flag FLG associated with the edited actual data RD (step S11).

The writing unit 40c then checks the writing type TY of the edited actual data RD and determines whether or not that data is date for which the immediate writing is requested (step S12).

In a case of being the date for which the immediate writing is requested (step S12: Y), the writing unit 40c immediately writes the edited data into a corresponding block on the non-volatile memory 20 (step S13).

In a case of not being the date for which the immediate writing is requested (step S12: N), the writing process is not immediately performed.

[Regarding State of Actual Data after Data Update]

Figure 7:
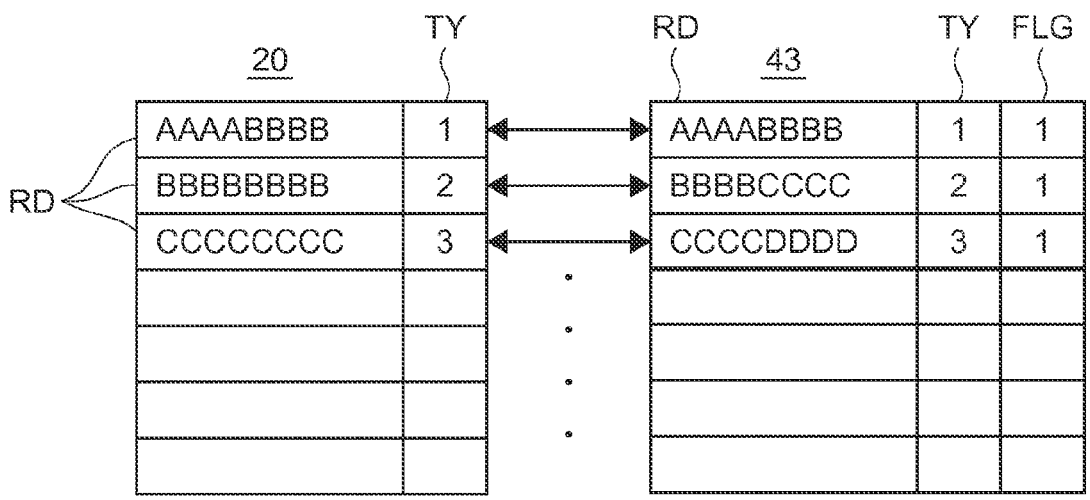
FIG. 7 is a schematic diagram illustrating a correspondence between the configuration of the block on the non-volatile memory and the configuration of the block on the RAM after data update is performed.

Next, what state the actual data RD on each of the non-volatile memory 20 and the RAM 43 is put into after the above-described data update is performed will be described. FIG. 7 is a diagram illustrating a correspondence between the above-described configuration of a block on the above-described non-volatile memory and the above-described configuration of a block on the above-described RAM after data update is performed.

First, regarding a block in the first line from the top, original actual data, "AAAAAAAA", is updated to "AAAABBBB" and the writing type TY is "1". Therefore, by performing the immediate writing, the actual data RD on the non-volatile memory 20 is updated to "AAAABBBB".

Next, regarding a block in the second line from the top, while the actual data RD on the RAM 43 is updated to "BBBBCCCC", the writing type is "2", and no writing is performed under the assumption that a writing period is yet to come. Therefore, the corresponding actual data RD on the non-volatile memory 20 remains original "BBBBBBBB".

In addition, regarding a block in the third line from the top, while the actual data RD on the RAM 43 is updated to "CCCCDDDD", the writing type is "3", and no writing is performed under the assumption that the image forming apparatus 1 is yet to be shut down. Therefore, the corresponding actual data RD on the non-volatile memory 20 remains original "CCCCCCCC".

Note that since all the above-described three pieces of actual data RD are edited, all the edit flags thereof are "1".

[Regarding Writing Process when Period Comes]

Figure 8:
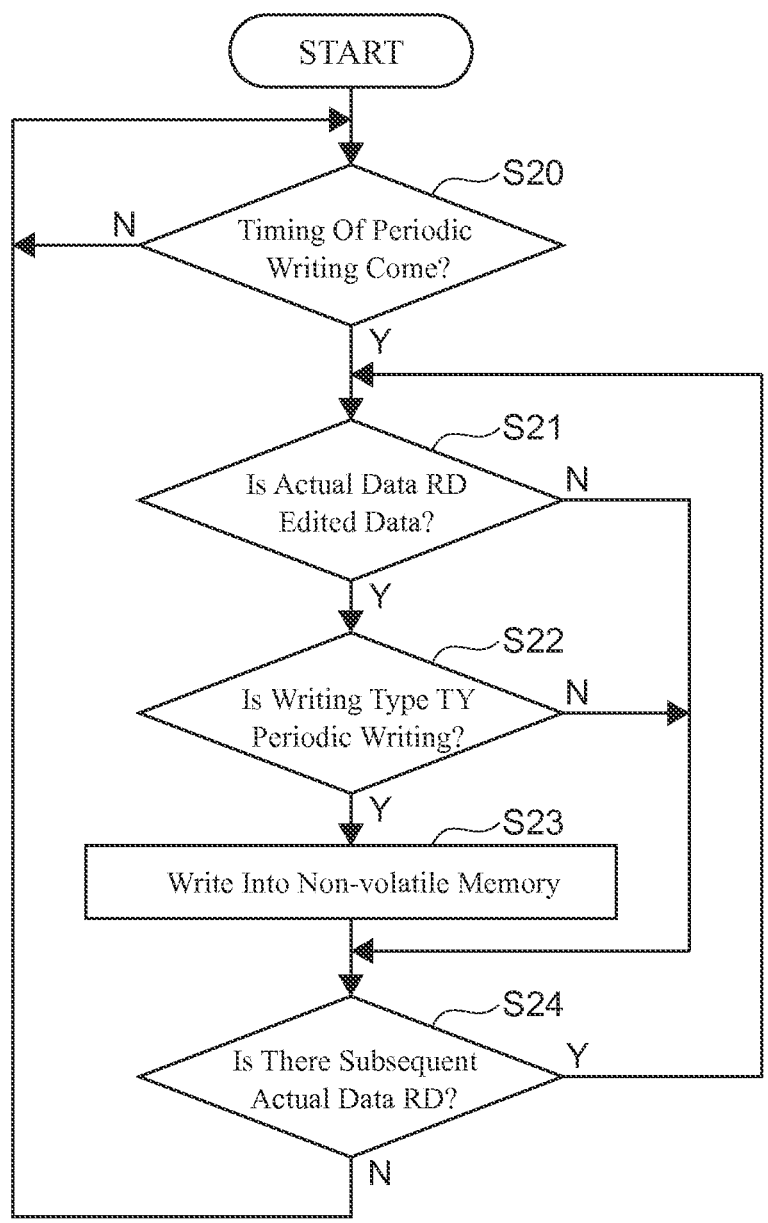
FIG. 8 is a flowchart of writing process performed with a preliminarily defined period.

The writing process performed at a time point when a preliminarily defined period comes will be described. FIG. 8 is the flowchart of the writing process performed with the preliminarily defined period.

First, the writing unit 40c determines whether or not the timing of the periodic writing comes (step S20).

In a case when it is not coming (step S20: N), the process returns to the step S20.

In a case when it is coming (step S20: Y), the writing unit 40c determines whether or not the actual data RD on the RAM 43, which serves as a write target, is edited data (step S21).

In a case of not being the edited data (step S21: N), the process proceeds to a step S24.

In a case of being the edited data (step S21: Y), the writing unit 40c determines whether or not the writing type TY of that actual data RD is the periodic writing (step S22).

In a case of not being the periodic writing (step S22: N), the process proceeds to the step S24.

In a case of being the periodic writing (step S22: Y), the writing unit 40c writes that actual data RD into a corresponding block in the non-volatile memory 20 (step S23).

Next, the writing unit 40c determines whether or not there is the subsequent actual data RD to be subjected to the writing process (step S24).

In a case where there is the subsequent actual data RD (step S24: Y), the process returns to the step S21 and the writing process is continued.

In a case where there is no subsequent actual data RD (step S24: N), the process returns to the step S20 and the process stands by until the subsequent writing period comes.

[Regarding Writing Process at Time of Shutdown of Image Forming Apparatus 1]

Figure 9:
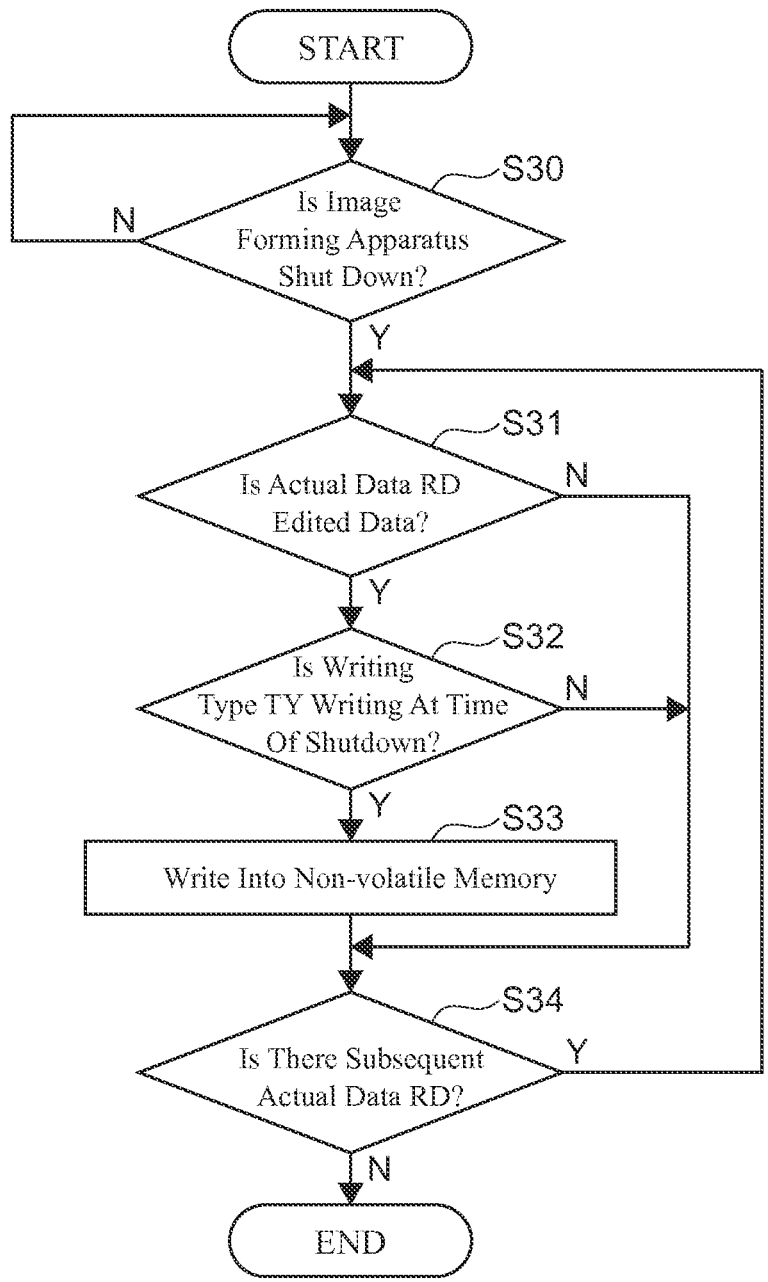
FIG. 9 is a flowchart of writing process performed at the time of shutdown of the image forming apparatus.

The writing process performed at the time of shutdown of the image forming apparatus 1 will be described. FIG. 9 is the flowchart of the writing process performed at the time of shutdown of the image forming apparatus 1.

First, the writing unit 40c determines whether or not the image forming apparatus 1 is about to be shut down (step S30).

In a case of not being about to be shut down (step S30: N), the process returns to the step S30.

In a case of being about to be shut down (step S30: Y), the writing unit 40c determines whether or not the actual data RD on the RAM 43, which serves as a write target, is edited data (step S31).

In a case of not being the edited data (step S31: N), the process proceeds to a step S34.

In a case of being the edited data (step S31: Y), the writing unit 40c determines whether or not the writing type TY of that actual data RD is writing at the time of shutdown (step S32).

In a case of not being writing at the time of shutdown (step S32: N), the process proceeds to the step S34.

In a case of being writing at the time of shutdown (step S32: Y), the writing unit 40c writes that actual data RD into a corresponding block in the non-volatile memory 20 (step S33).

The writing unit 40c then determines whether or not there is the subsequent actual data RD to be subjected to the writing process (step S34).

In a case where there is the subsequent actual data RD (step S34: Y), the process returns to the step S31 and the writing process is continued.

In a case where there is no subsequent actual data RD (step S34: N), the process is terminated.

In the above-described step S33, it is assumed that only the actual data RD whose writing type is the writing at the time of shutdown is written. However, note that, in addition to this, a configuration in which the actual data RD whose writing type is the periodic writing is written may be adopted.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image forming apparatus comprising:
a non-volatile memory that stores data;
a volatile memory into which the stored data is read for editing;
a control unit including a central processing unit (CPU) configured for:
reading the data in the non-volatile memory into the volatile memory;
editing the read data; and
writing the edited data in the volatile memory into the non-volatile memory, wherein:
the non-volatile memory includes a first block that includes the data and a writing type associated with each other, the writing type providing a rule of how to write at the time of writing the data into the non-volatile memory after editing the data on the volatile memory, the rule specifying how to write at the time of writing the data into the non-volatile memory after editing the data on the volatile memory such that the data be associated among each of being (i) immediately written into the non-volatile memory, (ii) written into the non-volatile memory after a preliminarily defined period, or (iii) written into the non-volatile memory at shutdown of the image forming apparatus;
the volatile memory includes a second block that includes the data, the writing type, and an edit flag associated with each other, the edit flag indicating whether or not the data is edited;
the CPU reads the writing type at the time of reading the data;
the CPU sets the edit flag at the time when the data read into the volatile memory is edited;
the CPU writes the edited data that the edit flag is set in the volatile memory into the non-volatile memory; and
the CPU i) when the rule specifies that the data should be immediately written into the non-volatile memory, immediately writes the edited data into the non-volatile memory, and the edited data includes a page counter of the image forming apparatus, which is not to be erased by power-off of the image forming apparatus in the middle of a series of processing operations, (ii) when the rule specifies that the data should be written into the non-volatile memory after the preliminarily defined period, writes the edited data into the non-volatile memory at a time point when the preliminarily defined period comes if the time point when the preliminarily defined period comes occurs before shutdown of the image forming apparatus or writes the edited data into the non-volatile memory at a time of shutdown of the image forming apparatus if shutdown of the image forming apparatus occurs before the time point when the preliminarily defined period comes, and the edited data is data where a great restriction is not put on a timing of being reflected in the non-volatile memory while being changed with a high frequency, and (iii) when the rule specifies that the data should be written into the non-volatile memory at shutdown of the image forming apparatus, writes the edited data into the non-volatile memory at the time of shutdown of the image forming apparatus, and the edited data is data where adequate shutdown process is not performed and erasing thereof is acceptable.

2. The image forming apparatus according to claim 1, wherein
the non-volatile memory includes a flash memory.

3. A method for performing writing into a non-volatile memory in an image forming apparatus, the image forming apparatus includes the non-volatile memory that stores data and a volatile memory into which the stored data is read for editing,
wherein:
the non-volatile memory includes a first block that includes the data and a writing type associated with each other, the writing type providing a rule of how to write at the time of writing the data into the non-volatile memory after editing the data on the volatile memory, the rule specifying how to write at the time of writing the data into the non-volatile memory after editing the data on the volatile memory such that the data be associated among each of being (i) immediately written into the non-volatile memory, (ii) written into the non-volatile memory after a preliminarily defined period, or (iii) written into the non-volatile memory at shutdown of the image forming apparatus;
the volatile memory includes a second block that includes the data, the writing type, and an edit flag associated with each other, the edit flag indicating whether or not the data is edited, the method comprising:

reading the writing type at the time of reading the data in the non-volatile memory into the volatile memory;

setting the edit flag at the time when the data read into the volatile memory is edited; and writing the edited data that the edit flag is set in the volatile memory into the non-volatile memory, which includes:

when the rule specifies that the data should be immediately written into the non-volatile memory, immediately writing the edited data into the non-volatile memory, wherein the edited data includes a page counter of the image forming apparatus, which is not to be erased by power-off of the image forming apparatus in the middle of a series of processing operations, when the rule specifies that the data should be written into the non-volatile memory after the preliminarily defined period, writing the edited data into the non-volatile memory at a time point when the preliminarily defined period comes if the time point when the preliminarily defined period comes occurs before shutdown of the image forming apparatus or writing the edited data into the non-volatile memory at a time of shutdown of the image forming apparatus if shutdown of the image forming apparatus occurs before the time point when the preliminarily defined period comes, wherein the edited data is data where a great restriction is not put on a timing of being reflected in the non-volatile memory while being changed with a high frequency, and when the rule specifies that the data should be written into the non-volatile memory at shutdown of the image forming apparatus, writing the edited data into the non-volatile memory at the time of shutdown of the image forming apparatus, wherein the edited data is data where adequate shutdown process is not performed and erasing thereof is acceptable.

4. The method according to claim 3, wherein the non-volatile memory includes a flash memory.

5. The image forming apparatus according to claim 1, wherein the rule associates the data with a first identifier if the data is to be immediately written into the non-volatile memory, a second identifier if the data is to be written into the non-volatile memory after the preliminarily defined period, and a third identifier if the data is to be written into the non-volatile memory at shutdown of the image forming apparatus.

6. The image forming apparatus according to claim 1, wherein the rule can only associate the data, at the time of writing the data into the non-volatile memory after editing the data on the volatile memory, as each of (i) immediately written into the non-volatile memory, (ii) written into the non-volatile memory after the preliminarily defined period, or (iii) written into the non-volatile memory at shutdown of the image forming apparatus.

7. The method according to claim 3, wherein the rule associates the data with a first identifier if the data is to be immediately written into the non-volatile memory, a second identifier if the data is to be written into the non-volatile memory after the preliminarily defined period, and a third identifier if the data is to be written into the non-volatile memory at shutdown of the image forming apparatus.

8. The method according to claim 3, wherein the rule can only associate the data, at the time of writing the data into the non-volatile memory after editing the data on the volatile memory, as each of (i) immediately written into the non-volatile memory, (ii) written into the non-volatile memory after the preliminarily defined period, or (iii) written into the non-volatile memory at shutdown of the image forming apparatus.

* * * * *